United States Patent
Dolas et al.

(10) Patent No.: US 10,355,946 B1
(45) Date of Patent: Jul. 16, 2019

(54) CAPACITY PLANNING

(71) Applicant: Hortonworks, Inc., Santa Clara, CA (US)

(72) Inventors: Sheetal Dinkar Dolas, Sunnyvale, CA (US); Paul Daniel Codding, Richfield, MN (US)

(73) Assignee: Hortonworks, Inc., Santa Clara, CA (US)

( * ) Notice: Subject to any disclaimer, the term of this patent is extended or adjusted under 35 U.S.C. 154(b) by 388 days.

(21) Appl. No.: 14/871,889

(22) Filed: Sep. 30, 2015

Related U.S. Application Data

(60) Provisional application No. 62/173,313, filed on Jun. 9, 2015.

(51) Int. Cl.
*H04L 12/24* (2006.01)
*H04L 12/26* (2006.01)

(52) U.S. Cl.
CPC .......... *H04L 41/5054* (2013.01); *H04L 43/04* (2013.01)

(58) Field of Classification Search
CPC .............................. H04L 41/5054; H04L 43/04
See application file for complete search history.

(56) References Cited

U.S. PATENT DOCUMENTS

| | | | | |
|---|---|---|---|---|
| 2006/0130042 | A1* | 6/2006 | Dias ........................ | G06F 8/67 717/168 |
| 2008/0271038 | A1* | 10/2008 | Rolia ...................... | G06F 9/505 718/105 |
| 2009/0171718 | A1* | 7/2009 | Barlow .............. | G06Q 10/0633 705/7.27 |
| 2013/0086235 | A1* | 4/2013 | Ferris ..................... | G06F 9/505 709/223 |

(Continued)

OTHER PUBLICATIONS

Cloudera [online], "Capacity Planning with Big Data and Cloudera Manager," Cloudera Engineering Blog, Jun. 6, 2014, [retrieved on Dec. 14, 2018], retrieved from URL: <https://blog.cloudera.com/blog/2014/06/capacity-planning-with-big-data-and-cloudera-manager/<, 6 pages.

(Continued)

*Primary Examiner* — Michael A Keller
*Assistant Examiner* — Jsing Forging Lin
(74) *Attorney, Agent, or Firm* — Fish & Richardson P.C.

(57) ABSTRACT

Methods, systems, and apparatus, including computer programs encoded on computer storage media, for identifying a plurality of software components deployed on a cluster of computing nodes, each component operating on one or more respective nodes within the cluster to process a workload, each component utilizing at least the following resources of the one or more respective nodes: storage, processing power, memory, and disk and network input and output operations; determining, for each identified component, current and (Continued)

historical usages of the resources of the one or more respective nodes by the component when processing the workload; receiving data specifying a future workload; and calculating, from the current and historical usages of each component, an estimated capacity required for the cluster to process the future workload, where the estimated capacity specifies, at least, how many nodes should be in the cluster to process the future workload.

26 Claims, 4 Drawing Sheets

(56) References Cited

U.S. PATENT DOCUMENTS

| | | | | |
|---|---|---|---|---|
| 2013/0204948 A1* | 8/2013 | Zeyliger | ............ | G06F 9/44505 709/206 |
| 2013/0227558 A1* | 8/2013 | Du | ................... | G06F 9/45558 718/1 |
| 2014/0108648 A1* | 4/2014 | Nelke | ................ | H04L 41/5051 709/224 |
| 2014/0280961 A1* | 9/2014 | Martinez | ............ | H04L 41/5054 709/226 |
| 2015/0333994 A1* | 11/2015 | Gell | ................... | H04L 43/0882 709/224 |
| 2016/0188594 A1* | 6/2016 | Ranganathan | ...... | G06F 17/3048 707/769 |
| 2016/0218943 A1* | 7/2016 | Djukic | ................. | H04L 41/142 |
| 2016/0282857 A1* | 9/2016 | Devore | .................. | E02F 9/262 |
| 2016/0373370 A1* | 12/2016 | Suchter | ................. | G06F 9/5038 |

OTHER PUBLICATIONS

Hadoop Magazine [online], "How to Plan Capacity for Hadoop Cluster," Apr. 29, 2014, [retrieved on Dec. 14, 2018], retrieved from URL: <http://hadoopmag.com/how-to-plan-capacity-for-hadoop-cluster/>, 17 pages.

Herodotou et al., "Starfish: A Self-tuning System for Big Data Analytics," 5th Biennial Conference on Innovative Data Systems Research, Jan. 2011, 12 pages.

\* cited by examiner

CAPACITY PLANNING

RELATED CASES

This application claims benefit of U.S. Provisional Appl. No. 62/173,313, filed Jun. 9, 2015, which is herein incorporated by reference in its entirety.

BACKGROUND

This specification relates to capacity planning for a computer cluster.

A framework, e.g., Apache Hadoop, can be deployed to manage distributed storage and distributed processing of large data sets on clusters of many computers, i.e., nodes, which may be physical or virtual. Oftentimes, the computers are built from commodity hardware. The framework can include multiple components to be run on different nodes in the cluster. Each component can be responsible for a different task. For example, a first component, e.g., Hadoop Distributed File System (HDFS), can implement a file system, and a second component, e.g., Hive, can implement a database access layer. The components work together to distribute processing of a workload of files among the nodes in the cluster.

A cluster of computers running the framework can be highly scalable. Additional nodes can be added to the cluster to increase throughput. Each cluster can also be highly resistant to failure because data can be copied to multiple nodes in the cluster in case one or more nodes fail.

SUMMARY

In general, this specification describes a system for capacity planning for a computer cluster.

In general, one innovative aspect of the subject matter described in this specification can be embodied in methods that include the actions of identifying a plurality of software components deployed on a cluster of computing nodes, each component operating on one or more respective nodes within the cluster to process a workload, each component utilizing at least the following resources of the one or more respective nodes: storage, processing power, memory, and disk and network input and output operations; determining, for each identified component, current and historical usages of the resources of the one or more respective nodes by the component when processing the workload; receiving data specifying a future workload, where the data is either provided through user input or projected from historical data; and calculating, from the current and historical usages of each component, an estimated capacity required for the cluster to process the future workload, where the estimated capacity specifies, at least, how many nodes should be in the cluster to process the future workload.

Implementations can include one or more of the following features. Identifying, for each node in the cluster, a hardware profile of the node; determining, for each node from the respective hardware profile, current and historical usages of the resources of the node from at least one or more of the following metrics: a number of processors in the node, a number and type of disks, usage of the disks, an amount of physical memory, usage of the physical memory; and wherein calculating the estimated capacity required for the cluster to process the future workload for the cluster is based at least on the current and historical usages of each component and the current and historical usages of each node. Calculating the estimated capacity comprises: generating, from the current and historical usages of each component, a projection of resources that will be required by the cluster to process the future workload, where the projection is represented in terms of the following resources: storage, processing power, memory, and disk and network input and output operations; identifying an amount of resources provided by a particular node added to the cluster in terms of at least the following resources: storage, processing power, memory, and disk and network input and output operations; and calculating the estimated capacity required for the cluster to process the future workload by respectively dividing the storage, processing power, memory, and disk and network input and output operations represented by the projection of resources with the storage, processing power, memory, and disk and network input and output operations contributed by one node to be added to the cluster. Generating the projection of resources required comprises extrapolating from a regression analysis of storage, processing power, memory, and disk and network input and output operations used over a previous period of time. The projection of resources comprises a projected storage amount, a projected processor utilization, a projected memory utilization, a projected read/write disk utilization/throughput, and a projected network utilization/throughput, and wherein calculating the estimated capacity required for the cluster to process the future workload from the projection of resources and the amount of resources provided by the particular node comprises: calculating a first number of nodes needed to meet the projected processing utilization by dividing the projected processor utilization by a number of processor cores of the particular node; calculating a second number of nodes needed to meet the projected memory utilization by dividing the projected memory utilization by an amount of memory of the particular node; calculating a third number of nodes needed to meet the projected storage amount by dividing the projected storage amount by a product of a number of disks and a size of the disks of the particular node; and calculating a fourth number of nodes needed to meet the projected read/write disk throughput by dividing the projected read/write disk throughput by a product of a number of disks of the particular node and disk input and output throughput of the particular node; calculating a fifth number of nodes needed to meet the projected network throughput by dividing the projected network throughput by maximum sustainable network throughput of the particular node; and selecting the estimated capacity required for the cluster to process the future workload from a maximum of the first number, the second number, the third number, the fourth number, and the fifth number. Wherein the data is provided by user input, and wherein the user input specifying the future workload comprises one or more changes to the cluster, wherein the one or more changes include one or more of the following: a change in hardware platform, a change in components, or a change in workload, and further comprising: determining current and historical usages of resources in other clusters, each cluster in the other clusters processing workloads with the one or more changes; and generating an updated estimated capacity for the cluster after the one or more changes have been provided using the current and historical usages of resources in the other clusters. The one or more changes comprise a change in a type of workload to be processed by the cluster. The one or more changes comprise a change in an expected volume of data processed by the cluster. Generating instructions configured to display a user interface presenting the updated estimated capacity. The current and historical usages of the resources for each component is represented in terms of the following resources: storage, processing power, memory, and disk and network input and output operations. The plurality of components comprises a file storage system, and where determining the current and historical usages of the resources by the file storage system comprises determining the current and historical usages from at least one or more of the following metrics over a period of time: a total storage usage, a count of storage transactions, a replication factor, a count of files, directories, and blocks in existence, a count of snapshots, a count of input and output operations, and a size of data transfer for the input and output operations. The plurality of components comprises a resource manager, and where determining the current and historical usages of the resources by the resource manager comprises determining the current and historical usages from at least one or more of the following metrics over a period of time: a total count of jobs, a total count of containers in existence, a total count of containers per node, processing power consumed by all jobs, and memory consumed or blocked by all jobs. The plurality of components comprises a database system, and where determining the current and historical usages of the resources by the database system comprises determining the current and historical usages from at least one or more of the following metrics over a period of time: a count of tables, a count of regions used per table, a count of operations per table, an average operation latency per table.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination.

Particular embodiments of the subject matter described in this specification can be implemented so as to realize one or more of the following advantages. Capacity planning for a cluster of computers is often a time consuming, fragmented, and inaccurate process because workloads change over time. The system accurately generates a forecast of what capacity is needed to process a future workload for a computer cluster over a time period. The forecast is generated from current and previous use of the cluster for increased accuracy. The system can project capacity estimates for the cluster when users change configurations of the cluster, e.g., hardware, software, or workload type, or when users change a workload amount to be processed by the cluster.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
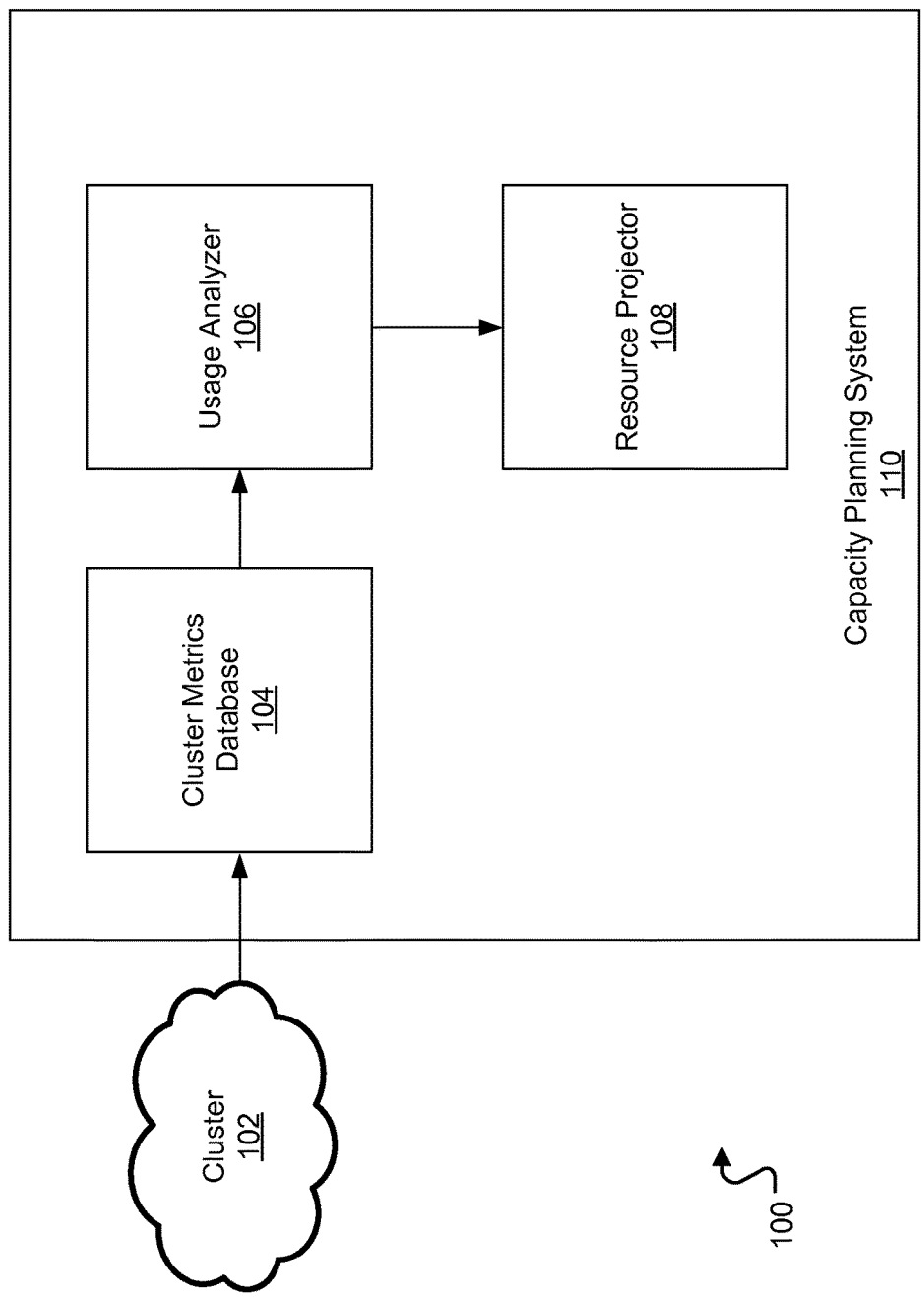
FIG. 1 shows an example system for capacity planning in a computer cluster.

FIG. 1 shows an example architecture 100 for a capacity planning system 110 for a computer cluster 102. The computer cluster 102 includes multiple computers, i.e., nodes, possibly at multiple locations. Each physical computer can include a processor, a memory, e.g., a random access memory (RAM), for storing instructions and data and a processor for executing stored instructions. The processor can be a central processing unit (CPU) or a graphics processing unit (GPU). The memory can include both read only and writable memory. The computer can be coupled to the cluster 102 through a data communication network, e.g., local area network (LAN) or wide area network (WAN), e.g., the Internet, or a combination of networks. In some implementations, the system is coupled to multiple other clusters.

The nodes in the cluster 102 can run one or more components of a framework, e.g., a Hadoop framework, for processing a large workload. The one or more components will be described with reference to FIG. 2. Generally, the workload dynamically changes over time. That is, the cluster 102 can have a larger workload to process over one period of time but have a smaller workload to process over a later period of time. In some cases, processing a workload includes storing portions of the workload in some nodes of the cluster.

If the workload changes significantly over a short period of time, the framework can notify a customer of the need to add to or remove nodes from the cluster 102 to ensure the workload is processed without downtime or performance degradation, and optionally take action to expand or contract the cluster based on need. Alternatively, the framework can generate and send a recommendation based on the workload changes to an administrator, who can manually add or removes nodes.

Each of the one or more components running on the cluster can produce metrics data that represent measurements of some properties of the component, which will be described with reference to FIG. 2. The metrics data can be produced on a per node basis, a per cluster basis, or both. The metrics data can also be measured over a time interval, e.g., daily, weekly, or monthly.

The cluster 102 can also produce metrics data from hardware profiles of nodes in the cluster. For example, the cluster 102 can produce metrics data for a number of nodes in the cluster 102 at a particular point in time or over a period of time.

Each node in the cluster, irrespective of the components running on the node, can also produce metrics data. By way of illustration, the metrics data from a hardware profile for a particular node can include a number of processors in the node, trending processor usage patterns over a time period, a number and type of disk in the node, e.g., Solid State Drive versus Hard Disk Drive, trending disk throughput/utilization over a period of time, trending network throughput/utilization over a period of time, an amount of physical memory, or trending memory usage over a period of time.

The cluster 102 stores the metrics data in a cluster metrics database 104. The metrics data can be stored regularly over a scheduled time interval, e.g., every day or every week. Alternatively, the system 100 can gather the data from the cluster 102.

A usage analyzer 106 reads the metrics data from the cluster metrics database 104 to determine a current and historical usage of the cluster. Determining the current and historical usage will be described with reference to FIG. 3.

A resource projector 108 can use the current and historical usage to project an estimated capacity of nodes required to process a future workload of the cluster. Estimating capacity to process the future workload will be described with reference to FIGS. 2-4.

Figure 2:
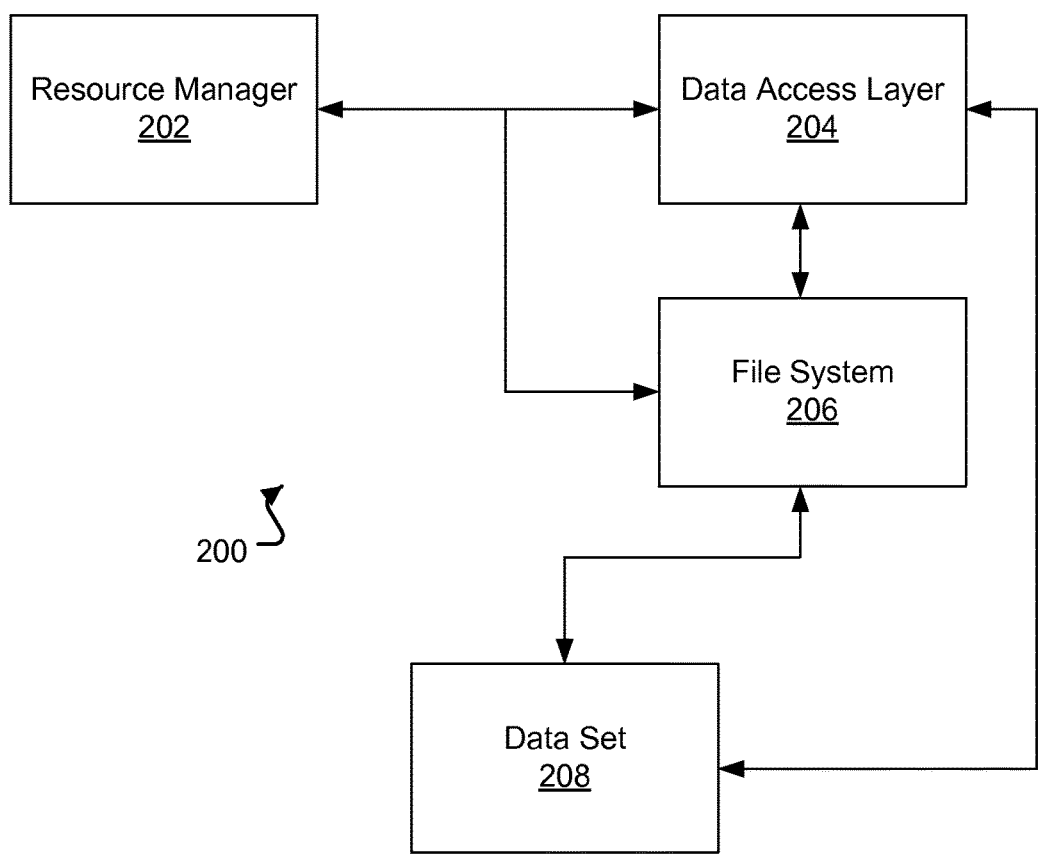
FIG. 2 shows example components running on the cluster to process a workload.

FIG. 2 shows example components of a framework, e.g., the Hadoop framework, running on the cluster to process a workload. Each component can operate on one or more nodes of the cluster. Each component plays a different role in processing a given workload. Each role can require generally has a different pattern of resource utilization, and therefore each component may utilize different amounts of resources of the one or more nodes on which the component runs.

By way of illustration, the workload can include a data set 208 to process. The data set 208 can be structured data or unstructured data or both. In some implementations, the data set 208 is accessible by components in the cluster. A file system 206 can structure and store portions of the structured data set 208 for processing. The file system 206 can also provide portions of the data set 208 to a database access layer 204, which can expose the data set 208 for user or computer access. Either the file system 206 or the database access layer 204 can access the data set 208 directly. A resource manager 202 can communicate with the database access layer 204 and the file system 206 to distribute the processing of the data set 208 by the components to other nodes in the cluster if necessary.

Each component executes actions for processing the workload, and produces metrics data that represent resources utilized by the component. For example, the file system 206 can produce metrics data of a total usage amount, e.g., how much disk space is being used, a count of transactions, a replication factor, e.g., how many times data should be replicated for redundancy purposes, a count of files, directories, and blocks in existence, a count of snapshots, a count of both disk and network input/output (I/O) operations, or a size of data transfer for the I/O operations on average or over a period of time.

The resource manager 202 can produce metrics data of a total count of jobs executed over a period of time, a total count of containers in existence, a total amount or percentage of processing consumed by all running jobs, or an amount of memory blocked or consumed by all running jobs.

The data access layer 204 can access a database storage component, e.g., HBase, that produces metrics data of a count of tables in existence in the database. For each table, the metrics data can include a count of regions used, a count of operations over a period of time, or an average operation latency over a period of time.

The metrics data of each component can be a measure of the amount of resources used by the one or more nodes running the component. That is, the metrics data of each component can be quantified into four types of resources used at the component for a particular workload: 1) storage, 2) processing power, 3) memory, 4) disk I/O operations, and 5) network I/O operations.

Therefore, the current workload processed by the cluster can be represented in terms of the four resources utilized, either on a per component basis or a per cluster basis. The representations can be stored in a cluster metrics database, e.g., the cluster metrics database 104 of FIG. 1, over regular intervals, e.g., daily, weekly, monthly, or yearly.

Figure 3:
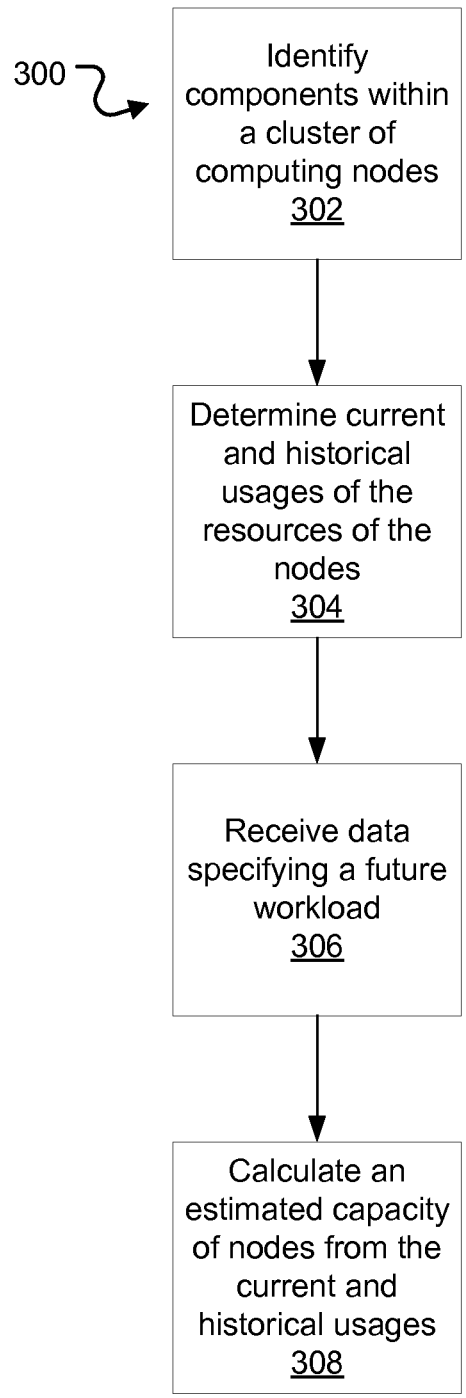
FIG. 3 is a flow diagram of an example method for estimating capacity of nodes to process a given workload for the cluster.

FIG. 3 is a flow diagram of an example method 300 for estimating capacity of nodes to process a particular workload for the cluster. For convenience, the method 300 will be described with respect to a system, e.g., the capacity planning system 110 of FIG. 1, having one or more computing devices that execute software to implement the method 300.

The system identifies components deployed on a cluster of computing nodes (step 302). Some clusters have a first set of components installed in the nodes, e.g., HDFS and HBase, while other clusters have a second unique set of components installed, e.g., Hive, HDFS, and Yet Another Resource Negotiator (YARN). Each cluster can maintain a list of active nodes and components installed in each node of the cluster. The system can identify the components of any given cluster from the maintained list.

The system determines, for each component, current and historical usages of the resources of the nodes running the component (step 304). In some implementations, the system retrieves current and historical usages for each component from a cluster metrics database, e.g., the cluster metrics database 104 of FIG. 1. In some implementations, as described above, the current and historical usages are represented by the following types of resources: 1) storage, 2) processing power, 3) memory, and 4) disk I/O operations, and 5) network I/O operations. The current and historical usages can span a duration of time, e.g., the previous 6 to 12 months.

The system receives data specifying a future workload (step 306). In some implementations, the future workload is provided to the system through user input.

In some other implementations, the system estimates the future workload from a current workload. That is, the current workload can have a given amount of data to process, store, or both at a particular point in time. However, the current workload can have an increased amount of data to process, store, or both compared to a prior point in time. The system can measure the rate of increase of the workload and extrapolate the future workload from the rate of increase.

The system calculates an estimated capacity of nodes required for the cluster to process the future workload from the current and historical usages of each component for a future workload (step 308). For example, using the current usage of each component for the current workload and historical usages for previous workloads, the system can generate a projection of resources to be used by each component for the future workload. A more detailed explanation of the projection of resources generated by the system will be described further below.

The system can calculate an estimated number of nodes that will be required from the extrapolated future usage of each component and how many nodes are used in the current workload. For sake of simplicity, based on historic patterns of use, the system will produce the following future projected node count for each resource: storage(2), processing power(4), memory(3), I/O operations(2). In this example, the node count projection for processing power would be chosen and the suggested node count for the future projection period would be 4 nodes.

In some implementations, the system not only estimates how many nodes will be required for the future workload but also suggests a type of node to add to the cluster and how many of them. The system can select the type of node to suggest based on current and historical usages of the cluster. For example, if the current and historical usages of the cluster include heavy processing and light storage utilization, the system can suggest that a node that is processor-heavy be added to the cluster. In contrast, if the current and historical usages of the cluster include light processing and heavy storage utilization, the system can suggest that a node that is disk-heavy be added to the cluster.

In some implementations, the system uses hardware profiles of the nodes to estimate the capacity of nodes that will be required for the future workload. For example, the system can extract metrics data from the hardware profile of a node, e.g., how many processors or cores are in the node or how many disks are in the node, e.g., as described above with reference to FIG. 1. The metrics data can specify what resources will be added when a particular node is added to the cluster. When a node is added to the cluster, the resource contribution of the node to the cluster can be quantified by four metrics: 1) storage, 2) processing power, 3) memory, and 4) disk I/O operations, and 5) network I/O operations.

When generating the projection of resources, the system can generate a projected storage amount, a projected processor utilization, a projected memory utilization, and a projected read/write disk throughput/utilization, and a projected network throughput/utilization.

The projected storage amount can be based on the storage utilization over a previous period of time. In some implementations, the projected storage amount is inferred from a regression analysis of storage utilization at a file system component, e.g., HDFS, over a previous 6-12 months. The type of regression analysis can be, but is not limited to, Bayesian, Logistic, or Lasso regression. In particular, the projected storage amount can be inferred as indicated by the regression at 6-12 months in the future.

The projected processor utilization, projected memory utilization, projected read/write disk throughput/utilization, and projected network throughput/utilization can be based on the processor utilization, the memory utilization, the amount of disk I/O, and the amount of network I/O, respectively, over a previous period of time. In some implementations, the projected processor utilization, projected memory utilization, projected read/write disk throughput/utilization, and projected network throughput/utilization is inferred from a regression of processor utilization, memory utilization, disk I/O, and network I/O of the cluster for the workload, respectively, over a previous 6-12 months. In particular, the projected processor utilization, projected memory utilization, projected read/write disk throughput/utilization, and projected network throughput/utilization can be inferred as indicated by the respective regression at 6-12 months in the future.

In some implementations, the system calculates the estimated number of nodes for processing a future workload by calculating a maximum of the number of nodes needed to meet the projected processing utilization, the number of nodes needed to meet the projected memory utilization, the number of nodes needed to meet the projected storage amount, the number of nodes needed to meet the projected read/write disk throughput/utilization, and the number of nodes needed to meet the projected network throughput/utilization.

In some implementations, the number of nodes needed to meet the projected processing utilization is the projected processor utilization, which is a number of projected cores to be utilized, divided by the number of processor cores per node.

In some implementations, the number of nodes needed to meet the projected memory utilization is the projected memory utilization divided by the amount of memory per node.

In some implementations, the number of nodes needed to meet the projected storage amount is the projected storage amount divided by a product of the number of disks per node and the size of disk per node.

In some implementations, the number of nodes needed to meet the projected read/write disk throughput is the projected read/write disk throughput divided by a product of the number of disks per node and the read/write I/O throughput per disk.

In some implementations, the number of nodes needed to meet the projected network throughput is the projected network throughput divided by maximum sustainable network I/O throughput per node. The calculation of the maximum sustainable network I/O throughput is a function of the network interface configuration per node, as well as the supporting switching and routing infrastructure capabilities as they are configured. Taking into consideration physical locations of hosts, racks, and the type and capabilities of the interconnect between nodes, top of rack switches, and core switching and routing infrastructure.

Figure 4:
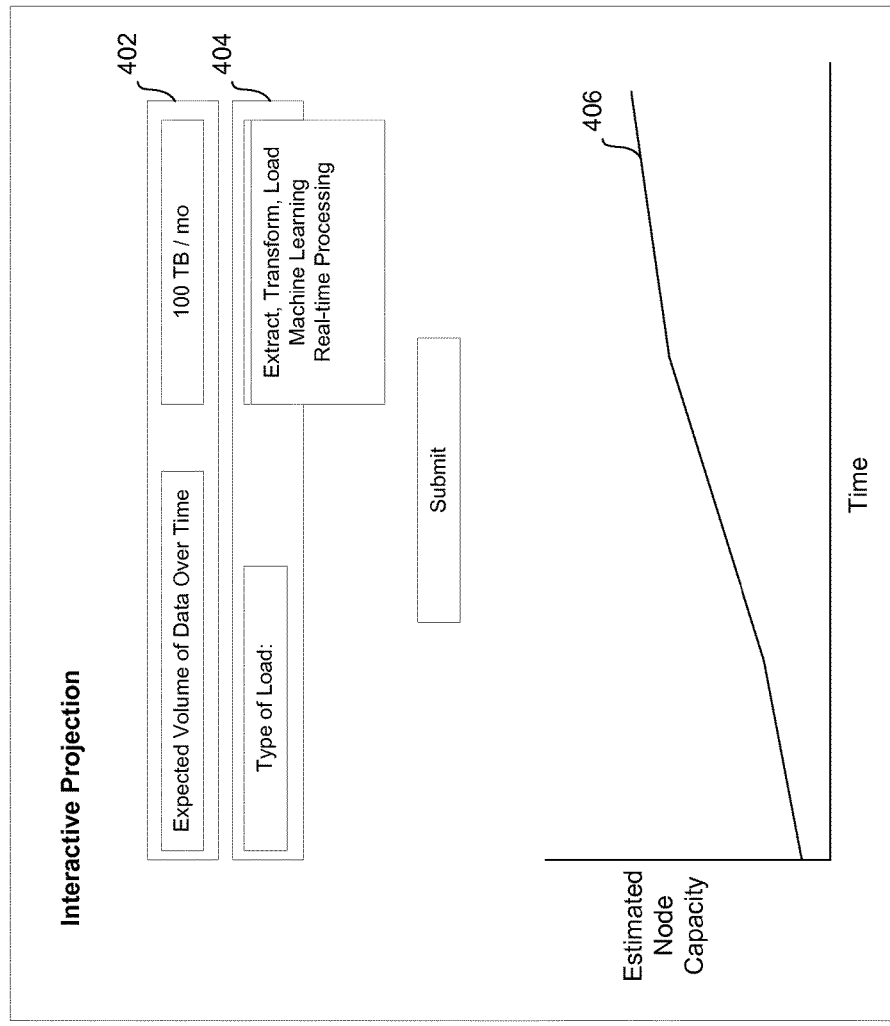
FIG. 4 shows an example user interface at a user device for a user to interact with cluster configurations and to view an updated estimated capacity of nodes to process a future workload based on the cluster configurations.

FIG. 4 shows an example user interface 400 at a user device for a user to interact with presentations of cluster configurations and to view an updated estimated capacity of nodes to process a future workload based on the cluster configurations. A capacity planning system, e.g., the capacity planning system 110 of FIG. 1, can generate instructions configured to display the user interface 400 on the user device, e.g., instructions in the form of Hypertext Markup Language (HTML) documents.

The user can interact with the user interface 400 to change one or more cluster configurations for a particular cluster. That is, the system can receive user input specifying the configuration changes, e.g., hardware, software, or workload type, to the cluster. In some implementations, the user provides user input, e.g., through a keyboard or mouse, specifying an expected volume of data over time 402, e.g., 100 TB per month, and specifying a type of load 404. For example, the type of load can be Extract, Transform, Load (ETL); Machine Learning; or Real-time Processing.

Each type of load can require different types and proportions of the following resources: 1) storage, 2) processing power, 3) memory, and 4) disk I/O operations, and 5) network I/O operations. For example, a Machine Learning type of load can require more processing power than a Real-time Processing type of load.

The system extrapolates an estimated capacity of nodes required to process a future workload 406 for the cluster after receiving the user input. In some implementations, the system estimates the capacity 406 by performing the methods described above with reference to FIG. 3. In some implementations, the system estimates the capacity 406 using current and historical usages of resources by other clusters that most closely match the cluster's workload, the type of load, installed components, and other hardware or software configurations specified by the user.

In particular, the system can access a cluster metrics database, e.g., the cluster metrics database 104 of FIG. 1, to determine the current and historical usages of resources for the other clusters. The cluster metrics database can store a workload associated with its type, its volume, a number of nodes for the workload, components installed on a given cluster processing the workload, and an amount of resources required to process the workload. The amount of resources can be quantified by 1) storage, 2) processing power, 3) memory, and 4) disk I/O operations, and 5) network I/O operations.

If the current and historical usages of the other clusters do not exactly match those of the cluster, the system can normalize the current and historical usages of the other clusters to those of the cluster. That is, if the other clusters have the same components as the cluster but have different workloads, thereby having different current and historical usages, the system can use the current and historical usages of the other clusters after applying a normalization factor based on the workload of the other clusters. For example, if another cluster has a workload twice as high as the cluster, the system can apply a normalization factor of 0.5, i.e., ½, to the current and historical usages of the other cluster for use in extrapolating the estimated capacity for the cluster.

Then, the system can extrapolate the estimated capacity of nodes required to process a future workload 406 for the cluster from the current and historical resources of those other clusters by performing the methods described above with reference to FIG. 3.

The system can then generate updated instructions to display a new user interface with the updated estimated capacity, and can send the updated instructions to the user device for display.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by a system of one or more computers, the method comprising:
   identifying a plurality of software components deployed on a cluster of computing nodes, each component operating on one or more respective nodes within the cluster to process a workload, each component utilizing at least the following resources of the one or more respective nodes: storage, processing power, memory, and disk and network input and output operations, and each of the plurality of software components on the cluster being components of a framework for processing the workload;
   determining, for each identified component, current and historical usages of the resources of the one or more respective nodes by the component when processing the workload, where one or more of the software components are deployed on multiple nodes of the cluster;
   receiving data specifying a future workload for a time 6-12 months in the future, where the data is either provided through user input or projected from historical data; and
   calculating, from the current and historical usages of each component, an estimated capacity required for the cluster to process the future workload at the time 6-12 months in the future, where the estimated capacity specifies, at least, how many nodes should be in the cluster to process the future workload at the time 6-12 months in the future;
   wherein calculating the estimated capacity comprises:
      generating, from the current and historical usages of each component, a projection of resources that will be required by the cluster to process the future workload, where the projection is represented in terms of the following resources: storage, processing power, memory, and disk and network input and output operations;
      identifying an amount of resources provided by a particular node added to the cluster in terms of at least the following resources: storage, processing power, memory, and disk and network input and output operations; and
      calculating the estimated capacity required for the cluster to process the future workload by respectively dividing the storage, processing power, memory, and disk and network input and output operations represented by the projection of resources by the storage, processing power, memory, and disk and network input and output operations contributed by one node to be added to the cluster.

2. The method of claim 1, further comprising:
   identifying, for each node in the cluster, a hardware profile of the node;
   determining, for each node from the respective hardware profile, current and historical usages of the resources of the node from at least one or more of the following metrics: a number of processors in the node, a number and type of disks, usage of the disks, an amount of physical memory, usage of the physical memory; and
   wherein calculating the estimated capacity required for the cluster to process the future workload for the cluster is based at least on the current and historical usages of each component and the current and historical usages of each node.

3. The method of claim 1, where generating the projection of resources required comprises extrapolating from a regression analysis of storage, processing power, memory, and disk and network input and output operations used over a previous period of time.

4. The method of claim 1, wherein the projection of resources comprises a projected storage amount, a projected processor utilization, a projected memory utilization, a projected read/write disk utilization/throughput, and a projected network utilization/throughput,
   and wherein calculating the estimated capacity required for the cluster to process the future workload from the projection of resources and the amount of resources provided by the particular node comprises:
   calculating a first number of nodes needed to meet the projected processing utilization by dividing the projected processor utilization by a number of processor cores of the particular node;
   calculating a second number of nodes needed to meet the projected memory utilization by dividing the projected memory utilization by an amount of memory of the particular node;
   calculating a third number of nodes needed to meet the projected storage amount by dividing the projected storage amount by a product of a number of disks and a size of the disks of the particular node; and
   calculating a fourth number of nodes needed to meet the projected read/write disk throughput by dividing the projected read/write disk throughput by a product of a number of disks of the particular node and disk input and output throughput of the particular node;

calculating a fifth number of nodes needed to meet the projected network throughput by dividing the projected network throughput by maximum sustainable network throughput of the particular node; and selecting as the estimated capacity required for the cluster to process the future workload a maximum of the first number, the second number, the third number, the fourth number, and the fifth number.

5. The method of claim 1, wherein the data is provided by user input, and wherein the user input specifying the future workload comprises one or more changes to the cluster, wherein the one or more changes include one or more of the following: a change in hardware platform, a change in components, or a change in workload, and further comprising:

determining current and historical usages of resources in other clusters, each cluster in the other clusters processing workloads with the one or more changes; and generating an updated estimated capacity for the cluster after the one or more changes have been provided using the current and historical usages of resources in the other clusters.

6. The method of claim 5, where the one or more changes comprise a change in a type of workload to be processed by the cluster.

7. The method of claim 5, where the one or more changes comprise a change in an expected volume of data processed by the cluster.

8. The method of claim 5, further comprising:
generating instructions configured to display a user interface presenting the updated estimated capacity.

9. The method of claim 1, where the current and historical usages of the resources for each component is represented in terms of the following resources: storage, processing power, memory, and disk and network input and output operations.

10. The method of claim 1, where the plurality of components comprises a file storage system, and where determining the current and historical usages of the resources by the file storage system comprises determining the current and historical usages from at least one or more of the following metrics over a period of time: a total storage usage, a count of storage transactions, a replication factor, a count of files, directories, and blocks in existence, a count of snapshots, a count of input and output operations, and a size of data transfer for the input and output operations.

11. The method of claim 1, where the plurality of components comprises a resource manager, and where determining the current and historical usages of the resources by the resource manager comprises determining the current and historical usages from at least one or more of the following metrics over a period of time: a total count of jobs, a total count of containers in existence, a total count of containers per node, processing power consumed by all jobs, and memory consumed or blocked by all jobs.

12. The method of claim 1, where the plurality of components comprises a database system, and where determining the current and historical usages of the resources by the database system comprises determining the current and historical usages from at least one or more of the following metrics over a period of time: a count of tables, a count of regions used per table, a count of operations per table, an average operation latency per table.

13. A system, comprising:
one or more computers; and
computer-readable medium coupled to the one or more computers and having instructions stored thereon, which, when executed by the one or more computers, cause the one or more computers to perform operations comprising:

identifying a plurality of software components deployed on a cluster of computing nodes, each component operating on one or more respective nodes within the cluster to process a workload, each component utilizing at least the following resources of the one or more respective nodes: storage, processing power, memory, and disk and network input and output operations, and each of the plurality of software components on the cluster being components of a framework for processing the workload;

determining, for each identified component, current and historical usages of the resources of the one or more respective nodes by the component when processing the workload, where one or more of the software components are deployed on multiple nodes of the cluster;

receiving data specifying a future workload for a time 6-12 months in the future, where the data is either provided through user input or projected from historical data; and calculating, from the current and historical usages of each component, an estimated capacity required for the cluster to process the future workload at the time 6-12 months in the future, where the estimated capacity specifies, at least, how many nodes should be in the cluster to process the future workload at the time 6-12 months in the future;

wherein calculating the estimated capacity comprises:
generating, from the current and historical usages of each component, a projection of resources that will be required by the cluster to process the future workload, where the projection is represented in terms of the following resources: storage, processing power, memory, and disk and network input and output operations;

identifying an amount of resources provided by a particular node added to the cluster in terms of at least the following resources: storage, processing power, memory, and disk and network input and output operations; and calculating the estimated capacity required for the cluster to process the future workload by respectively dividing the storage, processing power, memory, and disk and network input and output operations represented by the projection of resources by the storage, processing power, memory, and disk and network input and output operations contributed by one node to be added to the cluster.

14. The system of claim 13, further comprising:
identifying, for each node in the cluster, a hardware profile of the node;

determining, for each node from the respective hardware profile, current and historical usages of the resources of the node from at least one or more of the following metrics: a number of processors in the node, a number and type of disks, usage of the disks, an amount of physical memory, usage of the physical memory; and wherein calculating the estimated capacity required for the cluster to process the future workload for the cluster is based at least on the current and historical usages of each component and the current and historical usages of each node.

15. The system of claim 13,
wherein the data is provided by user input, and wherein the user input specifying the future workload comprises one or more changes to the cluster, wherein the one or more changes include one or more of the following: a change in hardware platform, a change in components, or a change in workload, and further comprising:
determining current and historical usages of resources in other clusters, each cluster in the other clusters processing workloads with the one or more changes; and
generating an updated estimated capacity for the cluster after the one or more changes have been provided using the current and historical usages of resources in the other clusters.

16. A non-transitory computer-readable medium having instructions stored thereon, which, when executed by one or more computers, cause the one or more computers to perform operations comprising:
identifying a plurality of software components deployed on a cluster of computing nodes, each component operating on one or more respective nodes within the cluster to process a workload, each component utilizing at least the following resources of the one or more respective nodes: storage, processing power, memory, and disk and network input and output operations, and each of the plurality of software components on the cluster being components of a framework for processing the workload;
determining, for each identified component, current and historical usages of the resources of the one or more respective nodes by the component when processing the workload, where one or more of the software components are deployed on multiple nodes of the cluster;
receiving data specifying a future workload for a time 6-12 months in the future, where the data is either provided through user input or projected from historical data; and
calculating, from the current and historical usages of each component, an estimated capacity required for the cluster to process the future workload at the time 6-12 months in the future, where the estimated capacity specifies, at least, how many nodes should be in the cluster to process the future workload at the time 6-12 months in the future;
wherein calculating the estimated capacity comprises:
generating, from the current and historical usages of each component, a projection of resources that will be required by the cluster to process the future workload, where the projection is represented in terms of the following resources: storage, processing power, memory, and disk and network input and output operations;
identifying an amount of resources provided by a particular node added to the cluster in terms of at least the following resources: storage, processing power, memory, and disk and network input and output operations; and
calculating the estimated capacity required for the cluster to process the future workload by respectively dividing the storage, processing power, memory, and disk and network input and output operations represented by the projection of resources by the storage, processing power, memory, and disk and network input and output operations contributed by one node to be added to the cluster.

17. The non-transitory computer-readable medium of claim 16,
wherein the data is provided by user input, and wherein the user input specifying the future workload comprises one or more changes to the cluster, wherein the one or more changes include one or more of the following: a change in hardware platform, a change in components, or a change in workload, and further comprising:
determining current and historical usages of resources in other clusters, each cluster in the other clusters processing workloads with the one or more changes; and
generating an updated estimated capacity for the cluster after the one or more changes have been provided using the current and historical usages of resources in the other clusters.

18. The system of claim 13, where generating the projection of resources required comprises extrapolating from a regression analysis of storage, processing power, memory, and disk and network input and output operations used over a previous period of time.

19. The system of claim 13, wherein the projection of resources comprises a projected storage amount, a projected processor utilization, a projected memory utilization, a projected read/write disk utilization/throughput, and a projected network utilization/throughput,
and wherein calculating the estimated capacity required for the cluster to process the future workload from the projection of resources and the amount of resources provided by the particular node comprises:
calculating a first number of nodes needed to meet the projected processing utilization by dividing the projected processor utilization by a number of processor cores of the particular node;
calculating a second number of nodes needed to meet the projected memory utilization by dividing the projected memory utilization by an amount of memory of the particular node;
calculating a third number of nodes needed to meet the projected storage amount by dividing the projected storage amount by a product of a number of disks and a size of the disks of the particular node; and
calculating a fourth number of nodes needed to meet the projected read/write disk throughput by dividing the projected read/write disk throughput by a product of a number of disks of the particular node and disk input and output throughput of the particular node;
calculating a fifth number of nodes needed to meet the projected network throughput by dividing the projected network throughput by maximum sustainable network throughput of the particular node; and
selecting as the estimated capacity required for the cluster to process the future workload a maximum of the first number, the second number, the third number, the fourth number, and the fifth number.

20. The system of claim 15, where the one or more changes comprise a change in a type of workload to be processed by the cluster.

21. The system of claim 15, where the one or more changes comprise a change in an expected volume of data processed by the cluster.

22. The system of claim 15, wherein the operations further comprise:
generating instructions configured to display a user interface presenting the updated estimated capacity.

23. The system of claim 13, where the current and historical usages of the resources for each component is represented in terms of the following resources: storage, processing power, memory, and disk and network input and output operations.

24. The system of claim 13, where the plurality of components comprises a file storage system, and where determining the current and historical usages of the resources by the file storage system comprises determining the current and historical usages from at least one or more of the following metrics over a period of time: a total storage usage, a count of storage transactions, a replication factor, a count of files, directories, and blocks in existence, a count of snapshots, a count of input and output operations, and a size of data transfer for the input and output operations.

25. The system of claim 13, where the plurality of components comprises a resource manager, and where determining the current and historical usages of the resources by the resource manager comprises determining the current and historical usages from at least one or more of the following metrics over a period of time: a total count of jobs, a total count of containers in existence, a total count of containers per node, processing power consumed by all jobs, and memory consumed or blocked by all jobs.

26. The system of claim 13, where the plurality of components comprises a database system, and where determining the current and historical usages of the resources by the database system comprises determining the current and historical usages from at least one or more of the following metrics over a period of time: a count of tables, a count of regions used per table, a count of operations per table, an average operation latency per table.

* * * * *